Patented Apr. 20, 1926.

1,581,112

UNITED STATES PATENT OFFICE.

WILLIAM P. M. GRELCK, OF ST. PAUL, MINNESOTA.

PROCESS FOR TREATING BRAN AND FLOUR MIDDLINGS FOR USE IN WHOLE-GRAIN BREAD.

No Drawing. Application filed January 27, 1922. Serial No. 532,335.

*To all whom it may concern:*

Be it known that I, WILLIAM P. M. GRELCK, a citizen of the United States, residing at St. Paul, in the county of Ramsey and State of Minnesota, have invented new and useful Improvements in a Process for Treating Bran and Flour Middlings for Use in Whole-Grain Bread, of which the following is a specification.

My invention relates to an improved process for treating bran and flour middlings by steeping them in water acidulated with lactic acid obtained by fermenting or souring milk, for the purpose of softening and partially digesting the cellulose; then reducing the cellulose by grinding the mash to a smooth creamlike paste; after which, the flours or milled products, which make up the whole-grain, are added to the paste and kneaded into a dough, fermented and baked in the usual manner.

It is my object to preserve the substances biologically known as vitamines, within the bran and middlings.

Another object of my invention is to improve the quality of bread dough by fermenting and reducing the coarser mill products before introducing them into the dough.

It appears that vitamines are more stable in the presence of weak acids, and those found in milk are far more stable in sour milk or butter milk than in sweet milk as well as more resistant to high temperatures. Therefore, I acidify the water, in which the bran and middlings are steeped, with buttermilk fermented to a high acid content, so as not to overdose the dough with milk protein which makes the bread less porous. I prefer to use for acidification of the water, condensed buttermilk, made under United States Letters Patent No. 1,230,479, which has a high lactic acid content. The acidulated steeping water attacks the cellulose contained within the bran and middlings, softens and partially dissolves the same, and by grinding the mash to a smooth paste, all of the ingredients, carbohydrates, proteins, and mineral matter within the bran and middlings, are, when the remaining ingredients of the grain are added and baked, exposed and subject to attack by the alimentary juices for practically complete digestion.

In the milling of wheat, the whole-wheat berry is separated approximately into the following milled products: 15 per cent bran, 11 per cent flour middlings, 2 per cent red dog flour, or third clear flour, 5 per cent second clear flour, 10 per cent first or fancy clear flour, and 57 per cent patent flour. It is well known that the patent flour has a high content of carbohydrates, but is low in proteins and mineral matter, while the so-called low grade or remaining milled products from the whole-wheat berry are high in proteins and mineral matter, and comparatively low in carbohydrates. The bran particularly contains substances which, if exposed to attack by the digestive juices, will yield matter which is highly efficient in maintaining normal nutrition. In methods heretofore applied in the manufacture of whole-grain breads, it has been found that the bran and middlings are only about 50 per cent digestible in the human alimentary canal. But by treating the bran and middlings as I propose, their digestibility is greatly increased and as a result I obtain a whole-grain bread which is as digestible as patent flour bread.

To manufacture a whole-grain bread I prefer to proceed as follows:

Steep 15 pounds of wheat bran together with 11 pounds flour middlings, including the germ of the wheat berry, in 60 pounds of water at a temperature of about 70 degrees F. To the water, is previously added 3 pounds condensed buttermilk or sour milk, with a lactic acid content of approximately 5 per cent, so that the mixture has a lactic acid content of approximately 0.2 per cent. The so prepared mash is left subject to self-fermentation for 24 hours for the purpose of softening and partially dissolving the cellulose contained within the bran and middlings, and the mash is then ground to a cream-like paste. With this paste is incorporated the finer ingredients of the milled grain in about the same proportion in which they are milled so that the normal constituents of the grain are restored. Exact proportions are not essential, but ideal amounts to add to the above described paste would be, say; 57 pounds of patent flour, 2 pounds of red dog or third clear flour, 5 pounds of second clear flour, and 10 pounds of first clear flour, together with 2 pounds of sugar, 2 pounds of salt, and 2 pounds of yeast. The whole mash is then kneaded into a dough, fermented, and baked into loaves in the usual manner.

Having described my invention what I claim as new and desire to protect by Letters Patent is:

1. The process of making whole grain bread which consists in first steeping the coarser ingredients of the grain, such as bran and flour middlings in the presence of lactic acid, without cooking the same, then grinding the mixture to the condition of a cream-like paste, and then incorporating into the uncooked paste the finer ingredients of the flour and other usual constituents of dough preparatory to baking the same.

2. The process of making whole-grain bread which consists in first steeping the coarser ingredients of the grain such as bran and flour middlings in water at a temperature of approximately 70 degrees Fahrenheit, then grinding the mixture to a cream-like paste, and then incorporating into the dough the finer ingredients of the flour and other usual constituents of dough preparatory to baking the same.

3. The process of preparing a whole grain bread, which consists in steeping fifteen parts by weight of wheat bran, together with eleven parts of flour middlings, including the germ of the wheat berry, in a quantity of acidulated water at a temperature of about 70 degrees Fahrenheit for approximately 24 hours, subsequently grinding the mass so prepared to a cream-like or pasty consistency and then making a dough by mixing the paste so prepared with the finer ingredients of the whole grain.

In testimony whereof, I have hereunto signed my name to this specification.

WILLIAM P. M. GRELCK.